US00RE41058E

(19) United States
(12) Reissued Patent
Barbanti

(10) Patent Number: US RE41,058 E
(45) Date of Reissued Patent: Dec. 29, 2009

(54) DEVICE CAPABLE OF SIGNALLING THE INFLATING CONDITION IN THE TIRES

(76) Inventor: Giovanni Barbanti, Via Podgora N° 1, 40033 Casalecchio di Reno (IT)

(21) Appl. No.: 11/223,914

(22) PCT Filed: May 25, 1999

(86) PCT No.: PCT/EP99/03613

§ 371 (c)(1),
(2), (4) Date: Nov. 27, 2000

(87) PCT Pub. No.: WO99/61264

PCT Pub. Date: Dec. 2, 1999

Related U.S. Patent Documents

Reissue of:
(64) Patent No.: 6,615,651
Issued: Sep. 9, 2003
Appl. No.: 09/701,445
Filed: May 25, 1999

(30) Foreign Application Priority Data

May 28, 1998 (EP) ..... 1998000109696

(51) Int. Cl.
*B60C 23/02* (2006.01)

(52) U.S. Cl. ..... 73/146.2; 73/146.8

(58) Field of Classification Search ..... 73/146–146.8; 340/442–447

See application file for complete search history.

(56) References Cited

U.S. PATENT DOCUMENTS

| | | | | |
|---|---|---|---|---|
| 2,866,432 | A | 12/1958 | Laurie, Jr. | |
| 2,906,282 | A | 9/1959 | Shannon | |
| 3,451,418 | A | 6/1969 | Nakagawa et al. | |
| 3,811,459 | A | 5/1974 | Schmidt | |
| 3,827,393 | A | 8/1974 | Winther | |
| 4,335,283 | A | 6/1982 | Migrin | |
| 4,793,277 | A | 12/1988 | Haas et al. | |
| 5,027,848 | A | 7/1991 | Leeuwen | |
| 5,325,808 | A | 7/1994 | Bernoudy, Jr. | |
| 5,694,969 | A | 12/1997 | DeVuyst | |
| 5,774,048 | A | 6/1998 | Achterholt | |
| 6,244,105 | B1 | 6/2001 | Nishihara et al. | |
| 6,247,513 | B1 | 6/2001 | Lukins | |
| 6,269,691 | B1 | 8/2001 | Sowatzke et al. | |
| 7,343,871 | B2 * | 3/2008 | Pellicciari | 116/34 R |

FOREIGN PATENT DOCUMENTS

| | | |
|---|---|---|
| DE | 43 32 717 A1 | 6/1994 |
| EP | 0 351 997 A2 | 1/1990 |

* cited by examiner

*Primary Examiner*—Andre J Allen
*Assistant Examiner*—Jermaine Jenkins
(74) *Attorney, Agent, or Firm*—Jacobson Holman PLLC

(57) ABSTRACT

The inventor discloses and claims a device for signaling the inflation condition of tires, as externally visible or as may be registered by remote audio or visual cues. The device generally is adapted to be attached to the stem valve of a tire without causing substantial loss of air pressure in the tire. The device may be loaded to register the inflation condition of the tire, following which loading the device may continue to register the inflation condition, without causing substantial loss of pressure in the tire.

14 Claims, 6 Drawing Sheets

DEVICE CAPABLE OF SIGNALLING THE INFLATING CONDITION IN THE TIRES

Matter enclosed in heavy brackets [ ] appears in the original patent but forms no part of this reissue specification; matter printed in italics indicates the additions made by reissue.

*This application is a Reissue of U.S. Pat. No. 6,615,651, issued Sep. 9, 2003 (application Ser. No. 09/701,445), which is the National Stage of International Application No. PCT/EP99/03613, filed May 25, 1999, which claims the benefit of and priority to EP 1998000109696, filed May 28, 1998.*

BACKGROUND OF THE INVENTION

The present invention relates to a device capable of signalling the inflating condition in the tires; the device comprises an external covering capable of rotating together with a threaded body used for screwing the device on the body of a standard inflating valve, a chamber defined inside the threaded body, an element sensible to the pressure existing in the chamber, a member which can be deformed by the pressure considering the temperature and a system capable of signalling the position of the deformable member.

STAND OF THE TECHNIQUE

U.S. Pat. No. 5,694,969 relates to a device for inflating a tire of a wheel. A pressure relief tire valve for inflating a tire wheel assembly has a tire inflation valve body having a chamber therein with openings through the top and bottom ends thereof and having a relief opening formed in the tire valve body. An inflation valve having a spring loaded central core to allow to pass inward is located in the tire valve body adjacent the tire inflation valve body top end for inflating the tire there through. An over pressure valve is located in the tire valve body for releasing air from the tire when the air pressure in the tire exceeds a predetermined level. The over pressure valve has a valve seat and valve element biased against the valve element by a compression for maintaining the valve element in a closed position until the predetermined air pressure is reached in the tire and to allow the valve element to open to release air through the valve body relief opening when the air pressure in the tire and to allow the valve element to open to release air through the valve body relief opening when the air pressure in the tire exceeds the predetermined pressure. A heat variable bellows supports the compression spring and is responsive to changes in temperature of the air in the tire so that the over pressure valve can prevent over inflating the tire as well as loss of tire pressure upon an increase of air pressure in the tire from an increase in temperature of the air in the tire.

U.S. Pat. No. 3,451,418 (Nakagawa Shunshi et Al.) [D1] discloses a device for indicating the interior pressure of a pneumatic tire; the device comprises an hollow body and inflatable means disposed in the hollow body; means being provided for maintaining the air valve of the pneumatic tire in a normally open position. The interior pressure of the pneumatic tire is in communication with the interior of the inflatable means. In addition, the device is also fitted with means capable of automatically indicating the interior pressure of the pneumatic tire at any given moment of time. The device is secured to the air valve of the pneumatic tire and is capable of having compressed air charged directly therethrough for inflating the pneumatic tire.

The device further comprises means for automatically closing the air valve of the pneumatic tire when the interior pressure thereof has dropped below a predetermined value.

U.S. Pat. No. 2,866,432 (Laurie) [D2] relates to a tire pressure indicating device.

A tire pressure indicator acts in combination with a valve stem having a tire valve therein. The indicator comprises a body having an open ended chamber adjacent one end thereof; a snap diaphragm is normally bowed outward, and extends across the open end of the chamber; indicator adjusting means are further provided for adjustably predetermining the normal arc of bowing of the diaphragm.

The tire pressure indicator is also fitted with sealing means to seal the diaphragm to the chamber in air-tight relation to thereby close the open end of the chamber to the atmosphere; the diaphragm being movable between an inward depressed position and the normally bowed outward position with an audible click action.

The other end of the body has a threaded bore in communication with the chamber and adapted to be detachably secured to the threaded end of the tire valve stem; a slidable plunger stem extends through the chamber and bore, the plunger having one end adapt to contact the inner surface of the diaphragm, while the other end of the plunger stem is positioned to contact the valve stem of the tire valve when the diaphragm is moved to the depressed position to thereby release the tire air pressure to within the bore and chamber behind the diaphragm.

In these and other documents of prior art the following features are not shown:

- a rod [of a plunger] having two sections with two external diameters if the difference between the tire pressure and the atmospheric pressure exceeds at least one pre-established threshold value;
- an element with variable geometrical configuration which closes a housing, the geometrical configuration of the element depending on the difference between the tire pressure and the atmospheric pressure; the element presenting a first geometrical configuration when the atmospheric pressure acts on the housing and the tire pressure is higher than the highest pre-established threshold value, and a second geometrical configuration when the tire pressure is below the lowest pre-established threshold value;
- a sealing member separating a first chamber, defined under the plunger, from a second chamber defined over the plunger;
- a first duct connecting the housing to the first chamber, which, in its turn, is connected to the atmosphere through a second duct, a channel and a groove;
- a third chamber being separated from the first chamber when the plunger is found in the first limit stop;
- ducts and a bistable valve fitted with a double closing device, acted by the element with variable geometrical configuration, for connecting the second chamber to the air tube, so that, when the element with variable geometrical configuration is found in the first configuration, the bistable valve can reach the first position of stability and the plunger can be found in the first limit stop, and, vice versa, for connecting the first and second chambers to each other, and for joining said chambers with the atmosphere through the second duct, the channel and the groove, when the element is found in the second configuration, and consequently, the bistable valve reaches the second position of stability;
- when the pressure falls below the lowest pre-established threshold value, the element with variable geometrical configuration for allowing the bistable valve fitted with a double closing device to reach the second position of stability and close the connection between a third duct and the second chamber through a channel and a fourth duct and to open the connection between the second chamber and the housing, in its turn jointed to the atmosphere through said channel and the third duct.

The technical effect of these distinguishing features is that the plunger is actuated by the difference in pressure between the first chamber defined under the plunger and the second chamber defined over the plunger. The pressure in this first and second chamber is established via a bistable valve actuated by the element with variable geometrical configuration which works like a spring diaphragm having two possible configuration depending on the pressure of the tire in relation of a threshold value.

Contrary to this method, the plunger of D1 works like a piston actuated by the tire pressure which compresses a mechanical spring.

The present invention solves the problem of providing different means which actuate the plunger depending on the tire pressure.

Although the Document D2 discloses a device capable of signalling the tire pressure comprising a spring diaphragm similar to the element with variable geometrical configuration of the present invention for indicating the tire pressure, this spring diaphragm indicates the tire pressure simply by its configuration, without engaging other members of the device.

Thus, even if the skilled person would use the spring diaphragm of D2 in the device of D1, there is no indication to link this spring diaphragm with a bistable valve in order to establish different pressures in a first and second chamber actuating the plunger depending on a threshold value of the tire pressure.

This and other documents of prior art do not regard a device for signalling the inflating state in the tires, but an assembly limiting pressure in the case of an excessive increase of the air tube temperature.

AIMS AND FEATURES OF THE INVENTION

The present invention, as claimed, solves the problem of creating a device capable of signalling the inflating condition in the tires. The results obtained by means of the present invention mainly consist in the fact that the function of checking and automatically preventing the escape of air from the tire continues to be effected by the self-closing core of the inflating valve also in presence of the device, which is, therefore, used only for signalling if the tire pressure is correct or not, without introducing the risk of the tire being defined in case the same device presents an escape.

The advantages offered by the invention consist in the fact that the tire pressure is indicated considering at least one threshold value; above said thresh old value the device signals the normal inflating state of the tire, while the same device signals the non correct inflating state when the tire pressure is below the same threshold value or another pre-established value lower than the previous threshold value; a temperature-sensing element allows to consider the temperature for defining the threshold values while a signalling system indicates if the tire inflating condition is correct or not.

BRIEF DESCRIPTION OF THE DRAWINGS

Other advantages, features and aims of the invention may be more readily understood by referring to the accompanying drawings, which concern a preferred embodiment, in which.

DESCRIPTION OF A PREFERRED EMBODIMENT OF THE INVENTION

Figure 1:
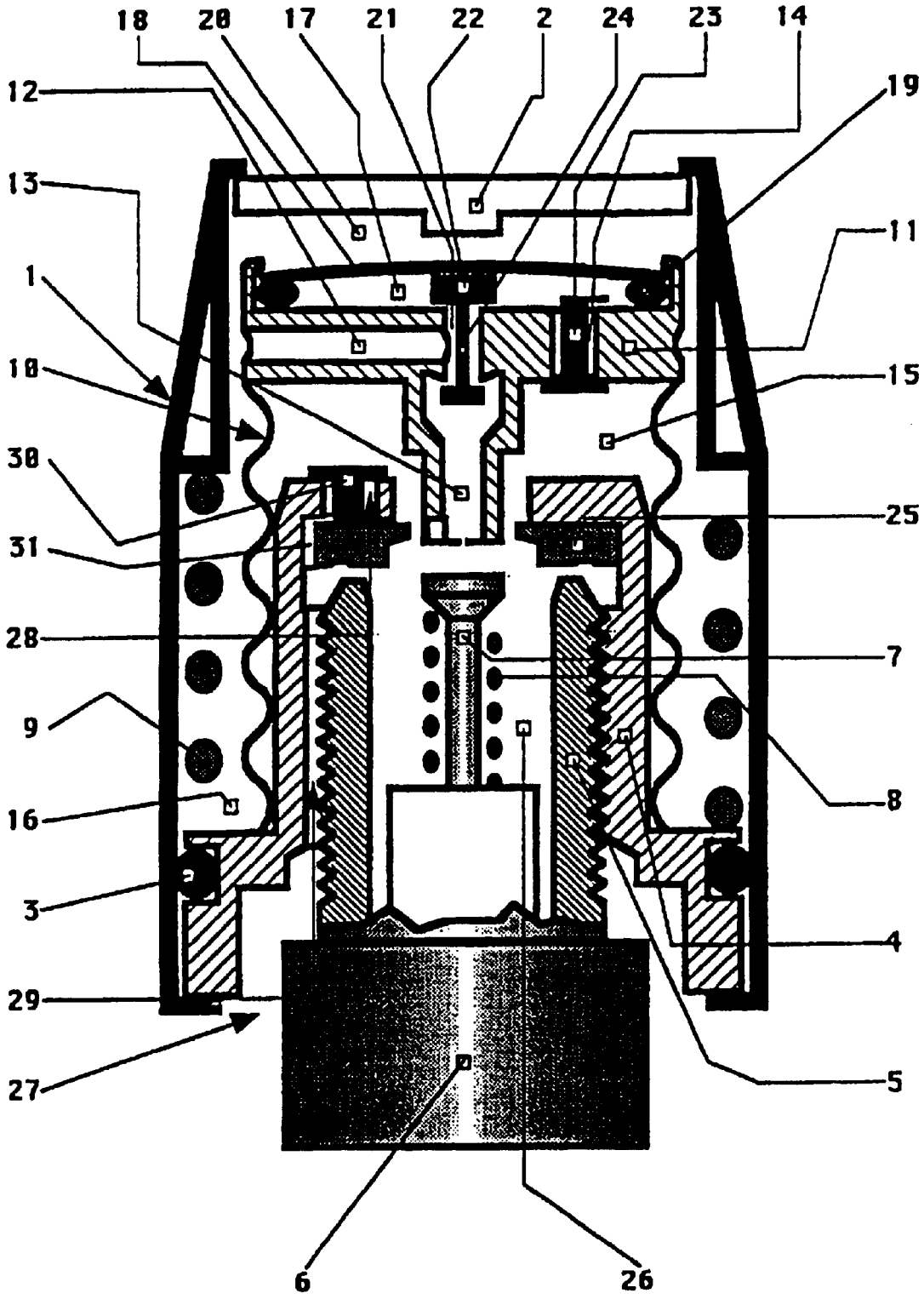
FIG. 1 represents the device before its tightening on the valve.

The device according to the invention consists of an external envelope 1, the upper wall 2 of which is preferably transparent; the envelope 1 rotates with a threaded body 4 which can be screwed on the threaded jointing tube 5 of the inflating valve 6; the valve 6 presents a self-closing valve core 7 stressed by a spring 8. The self-closing valve core 7 automatically prevents the escape of the air from the tire though allowing its inflating.

The external envelope 1 can slide axially with respect to the threaded body 4, being maintained in a stable limit stop with respect to the same body 4 by means of a spring 9; the sealing between the envelope 1 and the threaded body 4 is secured by a toroidal gasket 3.

A bellows 10 connects the threaded body 4 to a plunger 11, where three internal ducts 12, 13, 14 are bored. The bellows 10 allows the frictionless axial sliding of the plunger 11 inside the device; in addition, said bellows 10 separates two chambers 15, 20; the chamber 15 is found under the plunger 11 and inside the bellows 10, while the chamber 20 is located over the plunger 11 being connected to a chamber 16 with continuity; the chamber 16 is located outside the bellows 10. In this way, the plunger 11 can be axially moved by the differences of pressure which take place between the chamber 15 (lower) and the chamber 20 (upper).

In a not shown embodiment, the function of the bellows 10, consisting in separating the two chambers 15, 20 located, respectively, under and over the plunger 11, is carried out by a sliding gasket which causes friction when the plunger 11 is moved.

The upper part of the plunger 11 presents a housing 17 closed by a lamina 18 which can be deformed; a toroidal gasket 19 assures the sealing between the inner part of the housing 17 closed by the lamina 18 and the chamber 20 which is located between the upper wall 2 and the lamina 18, the chamber 20 being directly connected to the chamber 16. A channel 21 joints the housing 17 with the duct 13 bored inside the rod of the plunger 11; the rod presents two portions with different external diameters. The lamina 18 controls the channel 21 by means of a bistable valve 22 fitted with a double closing device, the valve 22 being operated by the same lamina 18 presenting a first position of stability when a first section of the closing device closes the connection between the housing 17 and the channel 21 allowing the connection between the duct 13 and the channel 21, and a second position of stability when a second section of the closing device closes the connection between the duct 13 and the channel 21 allowing the connection between the housing 17 and the channel 21.

The duct 14 connects the internal part of the housing 17 to the chamber 15 located under the plunger 11 and inside the bellows 10, the duct 14 being controlled by a self-closing valve 23 allowing the air passage from the housing 17 into the chamber 15, but not vice versa.

The duct 12 connects the chambers 16 (located in the external part of the bellows 10) and 20 (situated over the plunger 11) to the channel 21 where the rod 24 of the bistable valve 22 with the double closing device is inserted.

The envelope 1 transmits a torque to the threaded body 4, i.e. a rotation: in practice, when the device is screwed on the valve 6; the valve 6 is screwed on the envelope 1 with the fingers in order to transmit the torque which causes the rotation of the threaded body 4 for clamping the gasket 25 used for sealing the body of the valve 6 with respect to the device.

A chamber 26 is defined inside the jointing tube 5 of the inflating valve 6, the chamber 26 being separated from the chamber 15 only if the plunger 11 is found in the bottom limit stop so that the section of its rod having the larger diameter clamps the internal edge of the gasket 25.

When the gasket 25 is completely clamped, the chamber 15 located inside the bellows 10 is connected to the atmosphere 27 through a duct 28, a groove 31 and a channel 29. The duct 28 is controlled by a self closing valve 30, which is in opening position for allowing the air flow from the chamber 15 to the channel 21 and the channel 29, and consequently to the atmosphere 27, only if the gasket 25 has been completely clamped; in the case of insufficient clamping of the gasket 25 the valve 30 is not open, therefore, the passage of the air from the chamber 15 to the channel 21 and the channel 29, and consequently to the atmosphere 27, is prevented; this occurs even in the case of incomplete clamping of the gasket 25, provided that the gasket 25 is brought into contact with the threaded jointing tube 5.

The device shown in FIG. 1 has not yet been clamped on the valve 5, 6; in this case the attempt of loading the device causes no effect, therefore, the device automatically unloads, since, on one hand, the chamber 26, the ducts 13, 21, 12, the chamber 16 and the chamber 20, located over the plunger 11, do not maintain the tire pressure because of the air escape which takes place between the gasket 25, insufficiently clamped, and the valve body 5, with consequent blow-by and direct discharging to the atmosphere 27 through the channel 29, and, on the other hand, the discharge to the atmosphere of the chamber 15 located under the plunger 11 cannot occur (during the transient loading, the chamber 15 is subject to the air tube pressure before being isolated from the chamber 26 at the instant when the portion of the rod of the plunger 11 having the external larger diameter clamps the internal edge of the gasket 25): in fact, the valve 30 remains closed since it opens only because of the clamping compression of the gasket 25 and because of the thrust applied on the same valve 30 by the pressure existing in the chamber 15.

In addition, if the clamping of the gasket 25 on the threaded jointing tube 5 is incomplete, so that the blow-by towards the channel 29 and groove 31 occurs, the air will also tend to flow back to the chamber 15 through the groove 31 be cause of the losses of pressure due to the back flow through the channel 29. The right equilibrium between the losses of pressure in said channels 28, 29 can assure the unloading of the device for insufficient clamping of the gasket 25, even in the case of absence of the self-closing valve 30. For this reason, it is possible to immediately understand that the device is insufficiently tight, anyhow, situations of risk of deflating of the tire for insufficient tightening do not occur.

Figure 2:
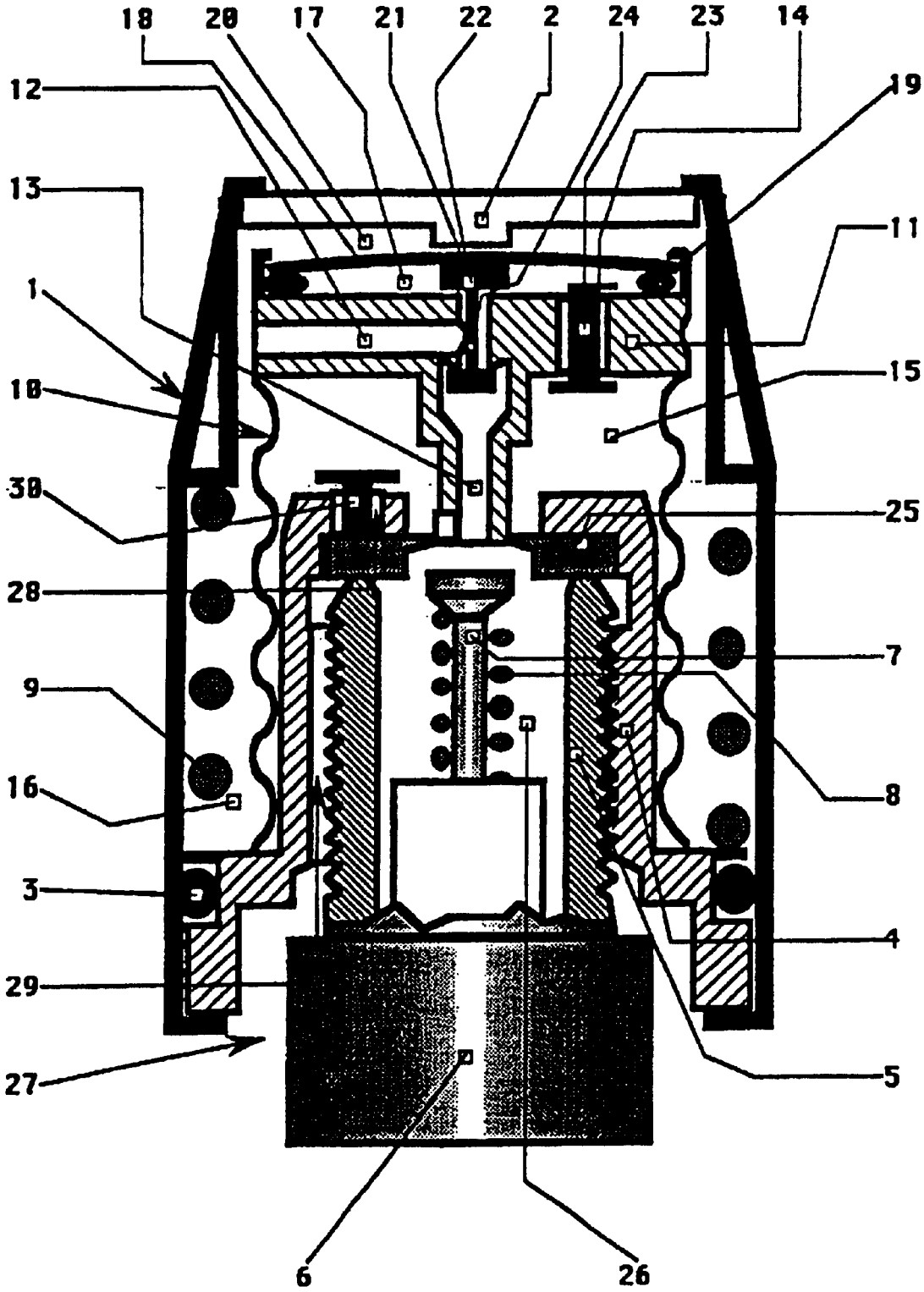
FIG. 2 represents the device after its tightening.

FIG. 2 shows the device after its tightening; after the complete screwing of the device on the valve 5, 6 of the tire, and therefore, obtaining the adequate tightening of the gasket 25 through screwing of the body 4 on the valve 5, 6, the device is ready to work. In the condition of FIG. 2 the device exactly works as a cap of a traditional tire inflating valve, i.e. the device does not carry out any function, but it is only used for protecting the valve. The tire valve 5, 6 is closed by the self-closing valve core 7, therefore, the air tube is neither connected to the chamber 26, nor to the atmosphere.

Usually, the lamina 18 is bent upwards; this bending is maintained until the pressure in the chamber 20 has reached a sufficiently high value with respect to the value of the pressure existing in the housing 17 (i.e. the atmospheric pressure, since the housing 17 is connected to the atmosphere, as it will more readily understood by referring to following description), therefore, when the pressure value is sufficiently high, the bending is directed downwards.

Figure 3:
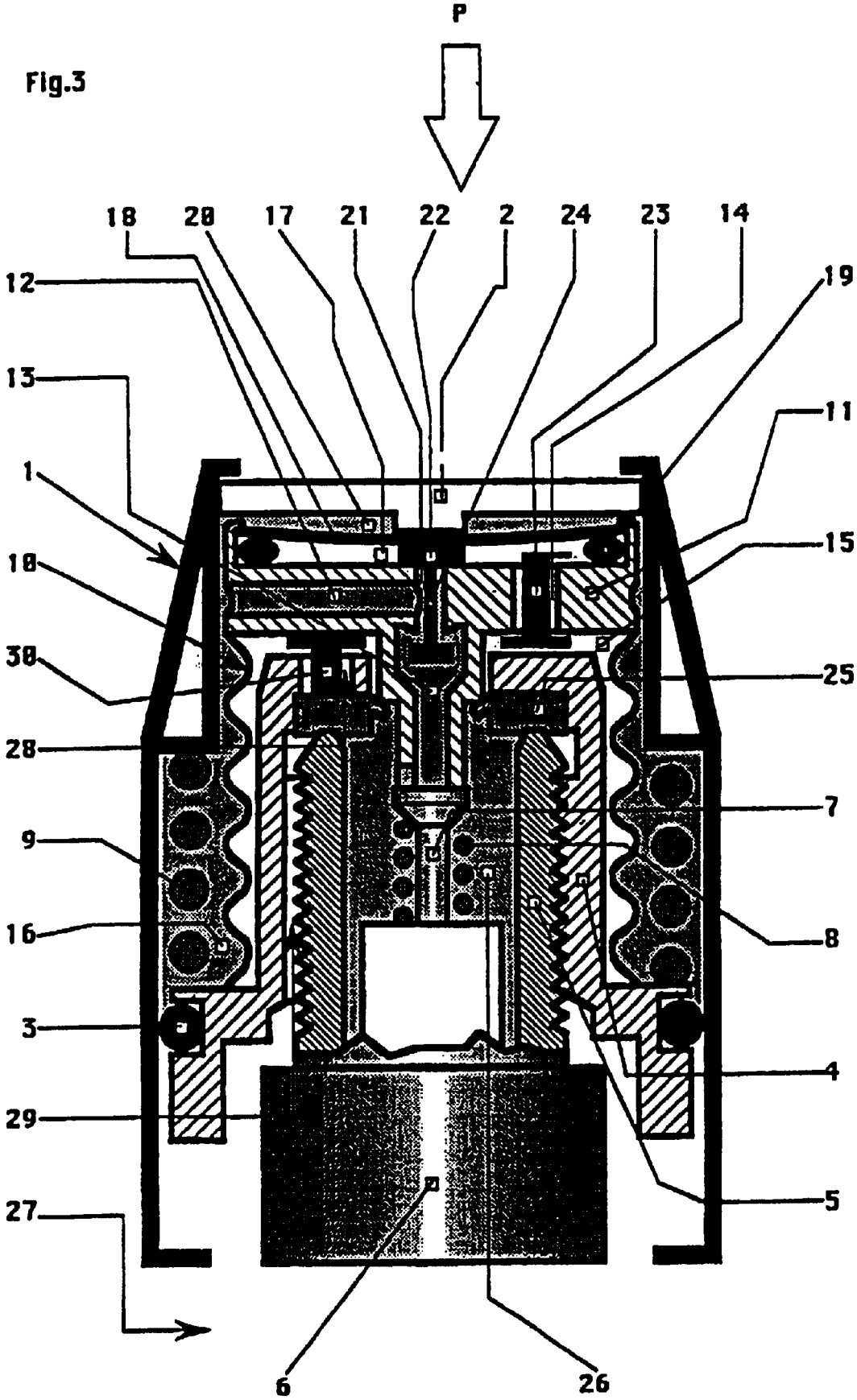
FIG. 3 shows the device during the loading phase.
Figure 4:
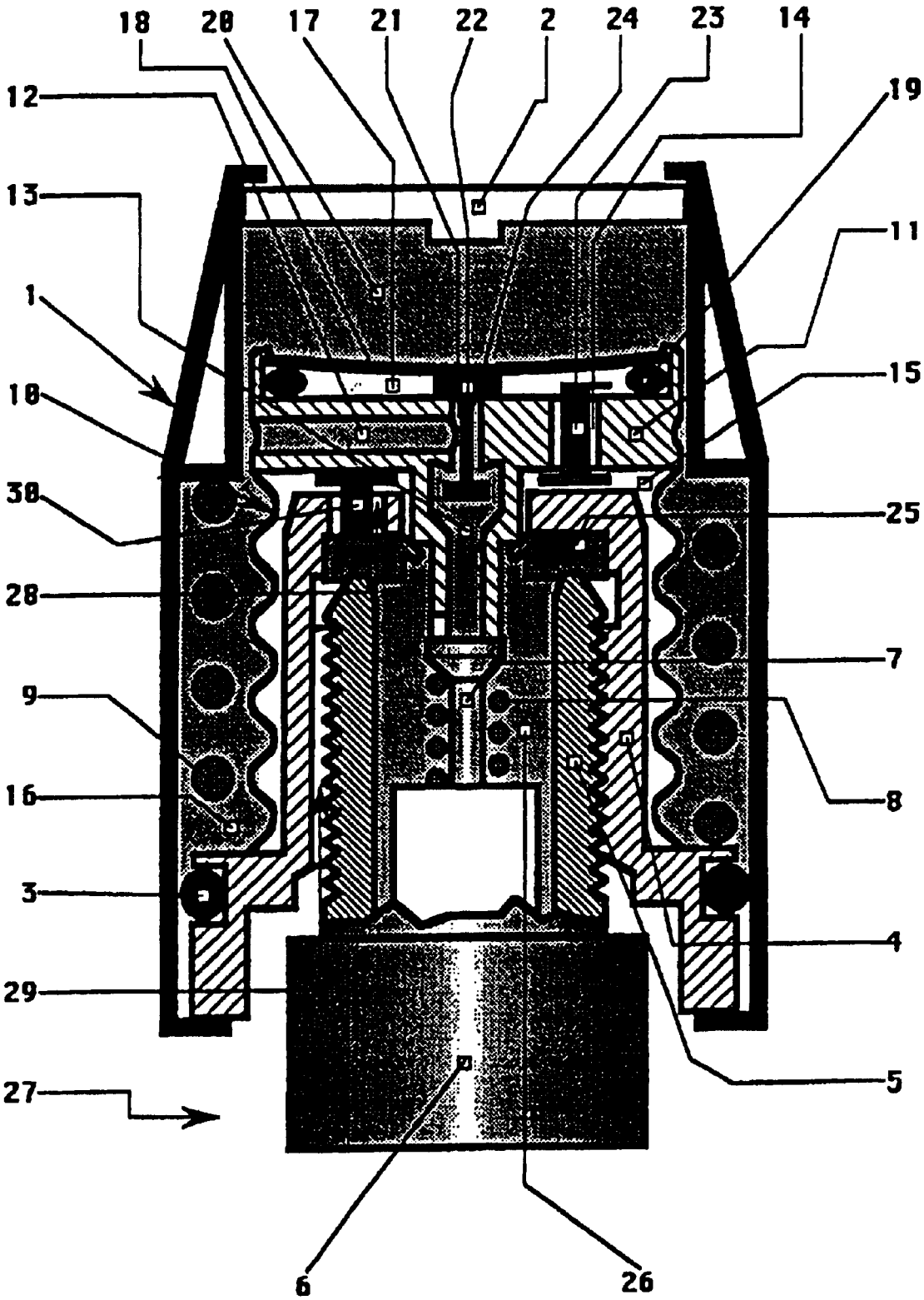
FIG. 4 represents the device after the loading phase.

In fact, the bending of the lamina 18 depends on the difference between the pressure in the chamber 20, which successively will be connected to the tire air tube, and the pressure in the housing 17, which will be connected to the atmosphere. If this difference of pressure, which advantageously can be corrected considering the temperature value in the case of balanced measure effected by a bimetal 18, is sufficiently high, the bimetal 18 will bend downwards, for reaching a stable downward bent position shown in FIGS. 3, 4 representing the functioning of the device, otherwise the bimetal 18 will maintain its upward bent configuration.

The subsequent operation consists in loading the device; this operation takes place (FIG. 3) by means of a manual external axial thrust P which causes the axial motion of the external envelope 1 with respect to the threaded body 4 by exceeding the thrust of the spring 9.

Because of the thrust P applied on the external body of the device (external envelope 1, wall 2) also the plunger 11 is moved downwards by the thrust P transmitted to the lamina 18 through the upper wall 2; owing to the thrust P, the lamina 18 is bent downwards just as it would happen if the pressure in the chamber 20 was sufficiently higher than the pressure in the housing 17. This is the loading operation, when the device is set at work, which would happen if the difference between the pressure in the chamber 20, on one hand, and the pressure in the housing 17 and the chamber 15 on the other hand, was sufficiently high. It is remarkable that, in this first phase of the transient loading, the difference between the pressure in the chamber 20, on one hand, and the pressure in the chamber 15 and the housing 17 (connected to each other through the duct 14) on the other hand, has not yet happened and stabilized, therefore, the bending of the lamina 18 and the downward motion of the plunger 11 occur only because of the mechanical thrust P.

This new geometrical configuration of the lamina 18 also causes the motion of the valve 22 fitted with a double closing device towards the first position of stability; therefore, the valve 22 connects the duct 13 to the duct 12 and the chambers 16, 20, and disconnects the jointing between the channel 21 and the housing 17. It is to remember that the chamber 20 extends from the upper surface of the lamina 18 to the chamber 16 external to the bellows 10 with continuity.

In addition, owing to the same thrust P the plunger 11 is moved downwards; therefore, the lower end of the rod of the plunger (inside which the duct 13 is bored) pushes downwards the end of the self-closing valve core 7, which opens to allow the air inside the tube to fill the chamber 26 defined inside the jointing tube 5 of the inflating valve 6.

The gasket 25 is also capable of sealing the rod of the plunger 11 by means of its internal lip only when the plunger 11, the rod of which presents two diameters, is moved towards the low limit stop shown in FIG. 3 (loading position). Consequently, if at the beginning of the opening of the self-closing valve core 7, during the downward motion of the plunger 11, the air coming out of the tube fills the chamber 26, the chamber 15, the duct 28, the channel 29, the groove 31 (and the ducts 12, 13, the channel 21, and the chambers 16, 20, since those cavities are connected to each other), in the moment when the plunger 11 has reached its low limit stop, and, therefore, the sealing between the rod of the plunger 11 and the gasket 25 is allowed, also the separation of the chamber 26 defined inside the jointing tube 5 of the inflating valve 6 takes place from the chamber 15 located under the plunger 11 and inside the bellows 10. It is remarkable that the sealing on the rod of the plunger 11, which is necessary for insulating the chambers 26 and 15 when the plunger 11 is found at the low limit stop, can also be obtained by means of a gasket difference from the gasket 25, for example, a toroidal gasket integral with the threaded body 4: the solution consisting in integrating the sealing in the same gasket 25 allows the reduction of the axial dimensions.

Once this condition is reached, the pressure existing in the air tube is established in the chamber 26, the ducts 12, 13, and the chambers 16 and 20; vice versa, the atmospheric pressure is established in the chamber 15 and the housing 17 and in the ducts 14, 28, 29 and the groove 31. Two cavities have, therefore, been separated, the first cavity 20 is found over the plunger 11, while the second cavity 15 is located under the plunger 11; this separation is due to the gasket 25 on one hand (sealing on the rod of the plunger 11) and, on the other hand, the bellows 10 (sealing on the plunger 11). When the external thrust P is removed, if the difference between the pressure in the chamber 20 and the pressure in the housing 17 (i.e. between the tube and the atmosphere) is sufficiently high (we remember that the chamber 15, through the internal duct 14, is also connected to the housing 17, which, in this way, is subject to the atmospheric pressure), the lamina 18 will maintain the downward bent configuration due to the thrust P, even when the same thrust P has been removed, and consequently the connection of the duct 13 to the housing 17 through the channel 21 will be closed, but the connection of the duct 13 to the duct 12 (and, therefore, of the duct 13 to the chambers 16, 20) through the same channel 21 will be open, thanks to the first position of stability reached by the bistable valve 22 fitted with a double closing device.

After the releasing of the thrust P, the spring 9 and the air pressure in the chambers 16, 20 move the external envelope 1 back upwards which reaches its original position shown in FIG. 4. In this configuration, if the air pressure (air tube pressure) existing in the chamber 20 (eventually corrected considering the temperature value in the case of a balanced measure effected by a bimetal 18), is such as to exert a stress on the upper surface of the lamina 18, the stress being sufficient to maintain the lamina 18 bent downwards (in fact, the atmospheric pressure exists in the housing 17); said stress also holds the plunger 11 fastened in its low limit stop, since, owing to difference in the active sections, said stress easily exceeds the thrust due to the air tube pressure on the rod of the plunger 11 and the thrust of the spring 8.

In such a way, the rod of the plunger 11 maintains the self-closing valve core 7 open for assuring the continuous connection between the air tube and the measuring system 18 through both the chamber 26 and the chamber 20, where the air tube pressure exists. Each air escape is obviously prevented by the sealing due to the gaskets 25, 19, 3 and the bellows 10. Consequently, as shown in FIG. 4, as long as the tire pressure (eventually corrected considering the temperature value) is maintained at a sufficient value, i.e. above the established threshold value defining the low limit of the correct inflating pressure of the tire, the device will remain loaded, i.e. with the lamina 18 bent downwards and the plunger 11 in its low limit stop; the same device will maintain the connection to the air tube through the self-closing valve core 7.

It is necessary to specify that the utility of the function attained by the device (i.e. signalling when the tire pressure falls bellow at least one pre-established threshold value) is relative to all normal working conditions, where the deflating of the tire takes place slowly, therefore, in a way difficult to perceive by means of common observation (phenomenon which takes place either be cause of natural causes, like an escape through the structure of the same tire, or because of external causes, like small punctures which cause a slow deflating); therefore, the device allows the duration needed for sensing the signal and operating as soon as possible in order to restore the most correct pressure value (and/or repair the eventual puncture for preventing the compulsory stop of the vehicle).

Obviously, the device will not offer any practical utility in the case of punctures or other serious phenomena causing the deflating of the tire in such a quick way that the duration for sensing the signal and acting consequently is insufficient.

Naturally, the pre-established threshold value defining the low limit of the correct inflating pressure can be defined in such a way to assure that the signalling of the exceeding of the same threshold value occurs when the pressure value in the tire is still sufficiently high to allow the duration needed for sensing the signal and acting in the usual operating situations when the deflating takes place slowly.

Figure 5:
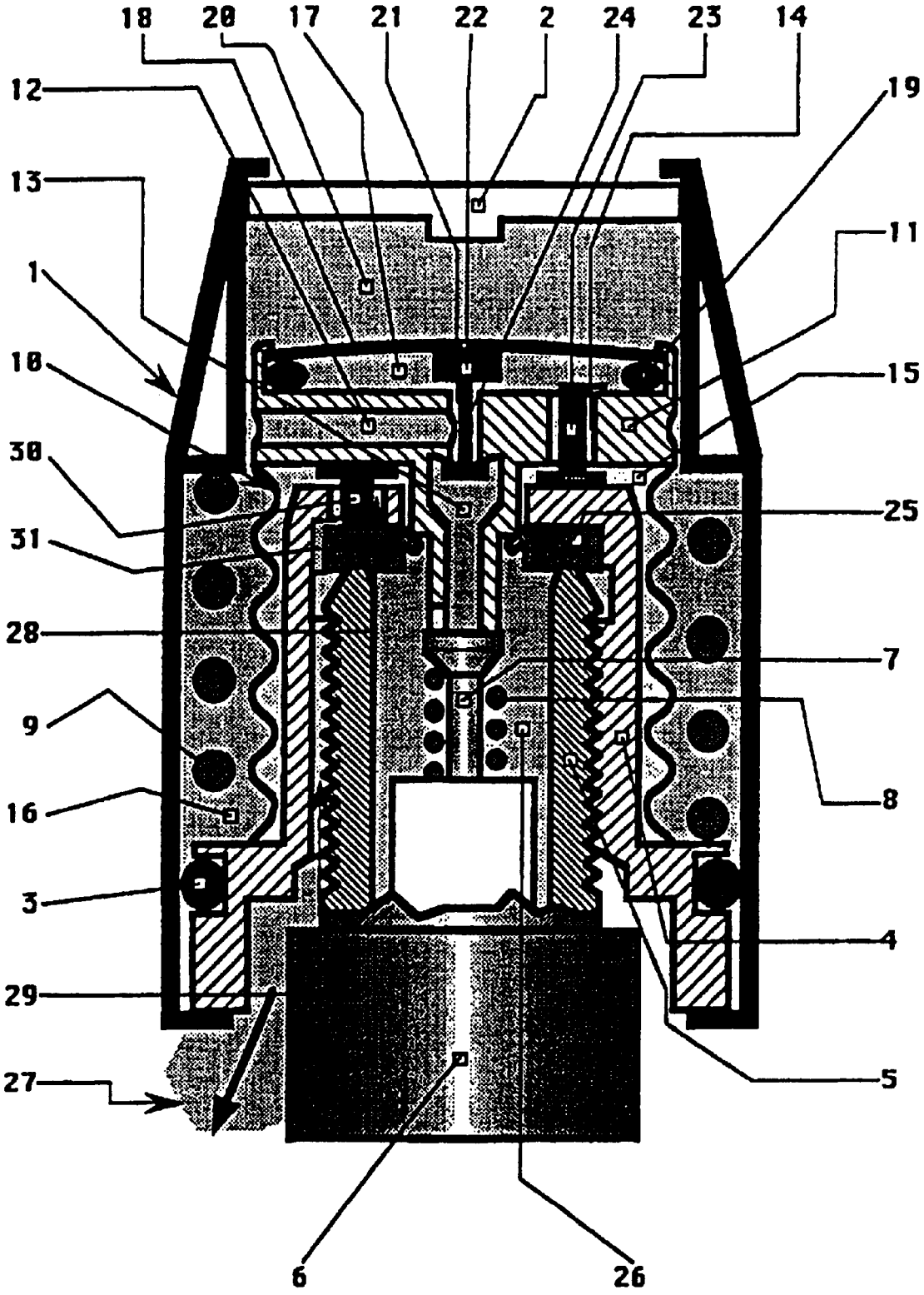
FIG. 5 demonstrates the behaviour of the device when the tire pressure has reached a value below a pre-established threshold.

When the pressure (eventually corrected considering the temperature value) falls below said pre-established threshold value (or below another threshold value lower than the previous), as shown in FIG. 5, the lamina 18 will bend up wards. This bending will immediately enable the bistable valve 22 fitted with a double closing device to automatically commute from the first to the second position of stability for closing the connection between the duct 13 and the chambers 16 and 20 (through the channel 21 and the duct 12); vice versa the connection between the chamber 20 and the housing 17 (through the duct 12 and the channel 21) remains open. The housing 17, through the duct 14, is connected to the chamber 15 which, in its turn, is connected to the atmosphere 27 through the duct 28, the channel 29 and the groove 31.

The aim to be attained when this situation occurs is the safe closing of the tire; therefore, the tire is insulated from the environment by means of the self-closing valve core 7 for preventing any air escape through the valve core 7 or the device. For this purpose, the device is so planned that the downward thrust acting on the group of the plunger 11 because of the difference between the pressure in the upper chamber 20 (where the tube pressure exists) and the pressure in the lower chamber 15 (where the environmental pressure exists), when the difference in pressure between the chamber 20 and the housing 17 is capable of maintaining the lamina 18 bent downwards, is so high to widely exceed the upward thrust acting on the plunger 11; this thrust being caused by the valve core 7 stressed upwards by the spring 8, the air tube pressure acting on the rod section of the plunger 11 and the elasticity of the bellows 10. In this way, the plunger 11 is guaranteed to remain in the loading position (low limit stop)

even in presence of external perturbations (vibrations, forces of inertia, etceteras).

The starting of the phenomenon which causes the unloading of the device is due to a change in the tire pressure (eventually corrected considering the temperature value) referred to the atmospheric pressure, said change being capable of bending the lamina 18 upwards, when the pressure in the cavities 17, 14, 15,28 and 29 still presents the atmospheric value and the pressure in the cavities 16, 20, 12, 21, 13 and 26 presents the air tube value (which has just fallen below the established threshold). In these conditions, the difference between the pressure in the upper chamber 20 (where the tube pressure exists) and the pressure in the lower chamber 15 (where the environmental pressure exists) acting on the plunger 11 is anyway still capable of maintaining the plunger 11 in the loading position (i.e. in the low limit stop): in fact, the planning of the active sections of the plunger 11 and of the relative rod will be chosen in such way that the resultant vector of the various above listed forces acting on the plunger 11 will anyway be directed downwards also for tire pressure values lower than the pre-established threshold value, while, once above said threshold value, the lamina 18 will bend upwards. Since the device has been planned for a practical utility in all normal working conditions where the deflating of the tire takes place slowly, at the instant when the tire pressure (eventually corrected considering the temperature) passes to a value lower than the threshold pre-established for this purpose, the lamina 18 will bend immediately upwards, but the resultant of the forces acting on the plunger 11 (the module of which will be changed in its turn, but only by a very small quantity the phenomenon being slow) will keep always directed downwards; furthermore, said resultant will present a value such as to permanently maintain the plunger 11 in the low limit stop, until the pressure in the upper chamber 20 falls considerably. This notable fall occurs as a direct immediate consequence of the upward bending of the lamina 18.

In fact, the motion towards the second position of stability of the valve 22 fitted with a double closing device consequent to the modification of the geometrical configuration of the lamina 18 causes a sudden change in the pressures within the various cavities. The jointing between the duct 13 (which remains at the tire pressure together with the chamber 26) and the chambers 16 and 20 (through the ducts 21 and 12) is disconnected, while the chambers 20 and 16 are emptied through the same ducts 12 and 21, the housing 17 (which now is connected to the channels 21 and 12), the duct 14, the chamber 15 and the channel 28, the groove 31 and the channel 29 which are directly connected to the atmosphere 27.

In this way, the pressure in the chamber 20 quickly falls, while, because of the losses of pressure which hinder the air flow to the atmosphere 27 through the duct 28, the groove 31 and the channel 29, the pressure in the chamber 15 tends to increase (previously the pressure in the chamber 15 presented the atmospheric value). This phenomenon associated with the upward thrust acted on the rod of the plunger 11 by the self-closing valve core 7 stressed by the spring 8 and the bellows 10, causes the sudden upstroke of the plunger 11 towards its high limit stop.

As soon as the upstroke of the plunger 11 starts, the rod with two diameters disengages from the gasket 25: in this way a direct connection is suddenly created between the chamber 26, which until the self-closing valve core 7 closes, remains at the tire pressure and is potentially fed by an considerable air flow, and the chamber 15 located under the plunger 11. In this way, the pressure in the chamber 15 immediately reaches the tire pressure value by exerting an upward stress on the plunger 11; said pressure value is maintained until the self-closing valve core 7 completely closed by reaching the scope of the present invention, while the self-closing valve 23 prevents the air from flowing towards the housing 17, and from this one, through the ducts 21 and 12, the air can reach the chamber 20 situated over the plunger 11, where in the meantime the pressure has fallen with respect to the tire value presented before exceeding the threshold.

In this way, the plunger 11, until the self-closing valve core 7 is completely closed, will be subject to an upward resultant thrust, the resultant thrust being due to the difference between the pressure in the chambers 15 and 20 plus the thrust applied to the needle of the self-closing valve core 7 stressed by the spring 8 and the thrust of the bellows 10, the resultant thrust being sufficient to move the plunger 11 upwards, even if an identical pressure value should be found in the chambers 15 and 20. In fact, the pressure in the chamber 15 re mains at the tire value, since the outlet flow from the self-closing valve core 7 still open is much higher than the loss flowing towards the atmosphere through the duct 28, the groove 31 and the channel 29: this fact assures that, even if the pressure in the chamber 20 should fall by a small quantity, or, even, revert to the value of the air tube at the moment when the disengagement of the rod of the plunger 11 from the gasket 25 occurs, as it might occur if the self-closing valve 23 was removed, the resultant of the stresses acting on the plunger 11 would anyway be always directed upwards thanks to the elastic action of the spring 8 and the bellows 10.

Figure 6:
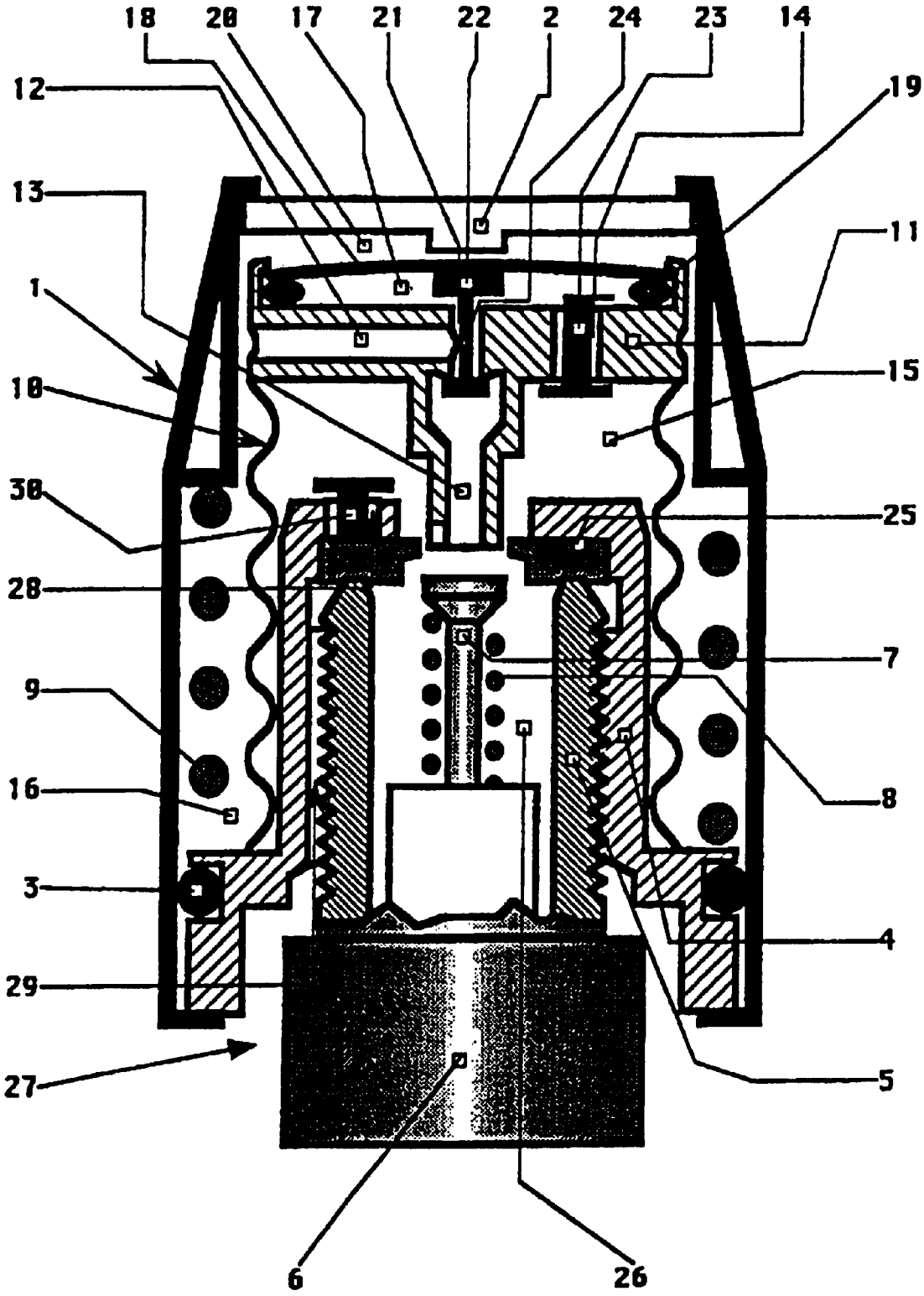
FIG. 6 represents the device after the decrease of the tire pressure below the threshold value.

This fact causes the sudden upstroke of the plunger towards its high limit stop and the closing of the self-closing valve core 7 by obtaining the desired result and the unloading of the device: when the self-closing valve core 7 closes, both chambers 20 and 15 are suddenly connected to environmental pressure (atmospheric pressure), while the plunger 11 completes its upstroke until it reaches the high limit stop thanks to the elasticity of the bellows 10 (FIG. 6).

In this way, the tire is immediately insulated from the environment; therefore, the self-closing valve core 7 always performs its function of safety and closing against air escapes through the inflating valve. This fact prevents any risk due to eventual escapes in the device.

If the plunger 11, after the loading phase, remains in the position such as to keep the self-closing valve core 7 open, i.e. in its low limit stop, that means the pressure in the air tube (eventually corrected considering the temperature value) is higher than the pre-established threshold value defining the low limit of the correct inflating tire pressure; vice versa, when the plunger 11 moves back to the high limit stop (i.e. it unloads) the pressure in the air tube (eventually corrected considering the temperature value) is lower than said pre-established threshold value, or another predefined threshold value lower than the previous one.

It is, then, sufficient to sense either the bending of the lamina 18 or the position of the plunger 11 (the stroke of which is of some mm.) for signalling the exceeding or not of the threshold value to the external with known means, the threshold value defining the low limit of the correct tire pressure. For example, a chromatic variation in function of the position of the plunger 11 can be displayed on a transparent visor applied to the wall 2. In addition, the displacement of the plunger 11 (or the change in the geometrical configuration of the lamina 18) can set at work an electrical circuit by means of which the emission of optical and/or acoustic signals can be obtained, said signals being transmitted by induction, or hertzian waves etc. with all its possible combinations.

The device can obviously be reloaded indefinite times; all times the condition of exceeding the threshold value will occur it will automatically unload and remain unloaded until subsequent hand loading by assuring that the signal can be received.

FIG. 6 shows the device after the falling in the tire pressure; in this case, the components of the device are again in the position of FIG. 2.

What is claimed is:

1. A device capable of signalling the inflating condition of a tire when screwed onto a jointing tube (5) of an inflating valve (6) that has a self-closing valve core (7) stressed for closure by a valve spring (8), the claimed device comprising:

a. an external envelope (1)

b. a threaded body (4) slidably mounted at least partially within and rotating together with the external envelope (1), which threaded body (4) is adapted to be screwed onto the jointing tube (5);

c. a plunger (11) fitted with a rod positioned to engage the self-closing valve core (7), and housing a lamina (18) that varies geometrical configuration from a resting configuration to a pressured configuration [in response to a pressure greater than a first pre-established threshold value], which variation effects movement within the rod of a bistable valve fitted with a double closing member (22);

d. a movable sealing member (10) connected to the plunger (11), which movable sealing member (10) delimits, with respect to the envelope (1), at least a first chamber (15) located under the plunger (11), and at least a second chamber (16, 20) located over the plunger (11); wherein the plunger (11) is movably [positioned between the first chamber (15) and] *in* the second chamber (16, 20) with a range of motion of a magnitude sufficient to cause the opening of the self-closing valve core (7) from a closed position, said range of motion being limited between:

i. a first limit stop position into which the plunger (11) is urged by the movable sealing member (10) [in an absence of pressurization], and in which the plunger (11) does not cause the opening of the self-closing valve core (7), and ii. a second limit stop position, in which the plunger (11) separates a third chamber (26) from the first chamber (15) by sealingly contacting a gasket (25) and causes the opening of the self-closing valve core (7); wherein this second limit stop position is successively maintained only if the difference between:

1. the pressure in the second chamber (16, 20), the value of which reaches the value in of the tire during the loading phase of the device, and 2. the pressure in the first chamber (15), which is connectable to atmospheric pressure is maintained higher than a first pre-established threshold value, so that a resultant thrust acting on the plunger (11) is higher than the forces of the valve spring (8) and the movable sealing member (10); and e. means for used signalling the configuration of the lamina (18) or the position of the plunger (11), whereby the device indicates if the pressure in the tire exceeds or not said first pre-established threshold value.

2. Device as in claim 1, wherein the lamina (18) with variable geometrical configuration [is a bistable valve] *acts on the bistable valve fitted with a double closing member* (*22*), the lamina (18) presenting a first position of stability and a second position of stability; in which first position of stability, the bistable valve (22) connects a first duct (12, 21) to a plunger housing (17) and closes the connection between the first duct (12) and a second duct (13); and in which second position of stability, the bistable valve (22) connects the second duct (13) to the first duct (21, 12) and closes the connection between a the first duct (12, 21) and the housing (17).

3. Device as in claim 2, wherein the lamina (18) with variable geometrical configuration is a bimetal for which [a] *the* pressure threshold at which the commutation of the geometrical configuration occurs is a function of the temperature.

4. Device as in claim 1, wherein the movable sealing member (10) comprises a bellows (10) allowing the frictionless axial translation of the plunger (11) inside the device, and separates a first chamber (15) from a second chamber (16, 20), said first chamber (15) and second chamber (16, 20) being respectively located under and over the plunger (11).

5. Device as in claim [2] *1*, wherein an external axial force (P) applied to the external envelope (1)

a. causes the axial translation of the external housing of the device and moves the envelope (1) with respect to the threaded body (4) against a thrust of a spring (9), so that the envelope (1) passes ii. from the first limit stop position which is in absence of said force maintained by the thrust of the spring (9), iii. to a second limit stop position, in which the envelope (1) remains only until the external force (P) is released;

b. is transmitted from the wall (2) to the lamina (18), and c. causes both iv. the change of the geometrical configuration of the lamina (18) towards its second configuration of stability and v. the motion of the plunger (11) towards the second limit stop position, in which the plunger (11) causes the opening of the self-closing valve core (7), and by interfering with the gasket (25), separates the third chamber (26) from the first chamber (15).

6. Device as in claim 1, wherein after the releasing of the force (P), the spring (9) and the thrust of the air pressure in the second chamber (16, 20) move the external envelope (1) towards the first stable limit stop position.

7. Device as in claim 1, wherein the position of the plunger (11) signals the exceeding or not of at least a first pre-established threshold *pressure* value, and wherein the wall (2) is transparent for displaying an indication selected from the group consisting of a chromatic change as a function of the position of the plunger (11), and the configuration of the lamina (18).

8. Device as in claim 7, wherein the activity selected from the group consisting of displacement of the plunger (11), and the change in the geometrical configuration of the lamina (18) sets at work an electrical circuit causing the emission of optical and/or acoustic signals.

9. Device as in claim 2, wherein the lamina (18) with variable geometrical configuration is connected to a housing (17) by a sealing member (19); and wherein further the bistable valve (22), through a channel (21), alternatively connects a first duct (12) to a second duct (13), or to the housing (17) according to the configuration of stability reached by the lamina (18), such that when the device is unloaded, the lamina (18) maintains a first configuration in which the plunger (11) does not cause the opening of the self-closing valve core (7), and the chambers (15, 16, 20, 17, 26), the ducts and the channels (12, 13, 21) communicate with the atmosphere (27).

10. Device as in claim [2] *1*, wherein the force necessary to move the plunger (11) from the first to the second limit stop position is transmitted by said envelope (1) and wall (2) to plunger (11) through the wall (2), which directly acts on the lamina (18) [with variable geometrical configuration] and causes the deformation of the lamina (18) to the second configuration; in this configuration the plunger (11) is located at the second limit stop position, the bistable valve fitted with a double closing member (22) connects the second duct (13) to the first duct (12), so that pressure of the tire exists in the third chamber (26), the second duct (13), the first duct (12) and the second chamber (16, 20), while the atmospheric pressure exists in the housing (17), a third duct (14) and the first chamber (15); in which position said second configuration of lamina (18) is maintained only if the difference between the pressure in the second chamber (16, 20) and in the housing (17) exceeds at least a first pre-established threshold value; in said condition the difference between the pressure in second chamber (16, 20) and first chamber (15) is the same as the difference between the pressure in second chamber (16, 20) and housing (17); until said difference in pressure is sufficient to maintain the second configuration of the lamina (18) the resultant force on the plunger (11) is sufficient to assure that the plunger (11) is maintained in the second limit stop position, so that the device remains loaded; if said difference in pressure is, or soon after decreases, until a value lower than a second and lower pre-established threshold value, the lamina (18) instantaneously moves again towards the first configuration; in such a way, the bistable valve fitted with a double closing member (22) intercepts the communication between the first duct (12) and the second duct (13) and connects the first duct (12) to the housing (17) which, in its turn, through third duct (14), the first chamber (15) and the channels (28, 29), is connected to the atmosphere (27); this causes the quick falling of the pressure in the second chamber (16, 20) to the atmospheric value; for this reason the plunger (11) moves again towards the first stable limit stop position; therefore, the lamina (18) indicates if the pressure in the tire exceeds or not at least a higher pre-established threshold value and causes the recovery of the plunger (11) to the first limit stop position (unloading condition) in which the plunger (11) does not cause the opening of the self-closing valve core (7) which closes again the communication with the internal part of the tire.

11. Device as in claim 9, wherein the force necessary to move the plunger (11) from the first to the second limit stop position during the loading phase is applied to the envelope (1) and wall (2) integral with the envelope (1), said force is transmitted by said envelope (1) and wall (2) to plunger (11) through the wall (2), which directly acts on the lamina (18) with variable geometrical configuration and causes the deformation of the lamina (18) to a second configuration; in this configuration the plunger (11) is located at the second limit stop position, the bistable double closing member (22) connects the second duct (13) to the first duct (12), so that pressure of the tire exists in second chamber (26), second duct (13), first duct (12) and second chamber (16, 20), while the atmospheric pressure exists in the housing (17), a third duct (14) and in first chamber (15); said second configuration of the lamina (18) can be maintained only if the difference between the pressure in second chamber (16, 20) and housing (17) exceeds at least a first pre-established threshold value; in said condition the difference between the pressure in second chamber (16, 20) and first chamber (15) is the same as the difference between the pressure in second chamber (16, 20) and housing (17); until said difference in pressure is sufficient to maintain the second configuration of the lamina (18) the resultant on the plunger (11) is sufficient to assure that the plunger (11) is maintained in the second limit stop position, so that the device remains loaded; if said difference in pressure is, or soon after decreases, until a value lower than a second and lower pre-established threshold value, the lamina (18) instantaneously moves again towards the first configuration; in such a way, the bistable valve fitted with a double closing member (22) intercepts the communication between the first duct (12) and the second duct (13) and connects the first duct (12) to the housing (17) , which, in its turn, through the third duct (14), the first chamber (15) and the channels (28, 29), is connected to the atmosphere (27); this causes the quick falling of the pressure in the second chamber (16, 20) to the atmospheric value, for this reason the plunger (11) moves again towards the first limit stop position; therefore, the lamina (18) indicates if the pressure in the tire exceeds or not at least a higher pre-established threshold value and causes the recovery of the plunger (11) to the first limit stop position (unloading condition) in which the plunger (11) does not cause the opening of the self-closing valve core (7) which closes again the communication with the internal part of the tire.

12. Device as in claim 9, wherein the lamina (18) with variable geometrical configuration is a bimetal (18) allowing to change the pressure threshold which causes the commutation of the configuration in function of the temperature.

13. Device as in claim 5, wherein after the releasing of the force (P), the spring (9) and the thrust of the air pressure existing in the second chamber (16, 20) move again the external envelope (1) towards the first stable limit stop position.

14. Device as in claim 1, wherein the displacement of the plunger (11) or the change in geometrical configuration of the lamina (18) set at work an electrical circuitry by means of which the emission of optical and/or acoustic signals is obtained to be transmitted via electromagnetic waves.

* * * * *